(No Model.)
L. D. BALL.
BREAD KNIFE.
No. 542,583. Patented July 9, 1895.
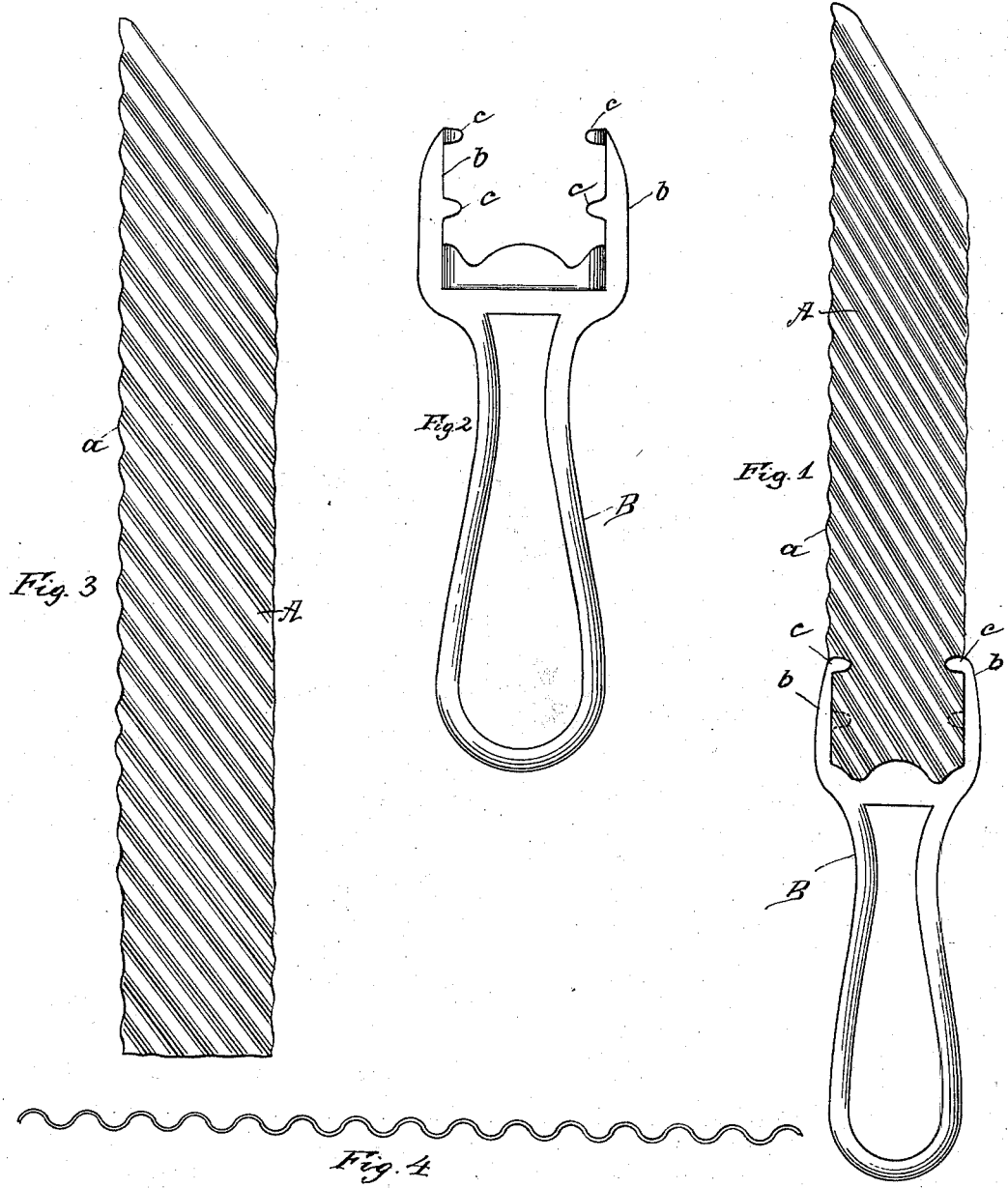

UNITED STATES PATENT OFFICE.

LORENZO D. BALL, OF CANTON, OHIO, ASSIGNOR OF TWO-THIRDS TO GEORGE HUMPHRIES AND SAMUEL KAUFFMAN, OF SAME PLACE.

BREAD-KNIFE.

SPECIFICATION forming part of Letters Patent No. 542,583, dated July 9, 1895.

Application filed July 9, 1894. Serial No. 516,920. (No model.)

*To all whom it may concern:*

Be it known that I, LORENZO D. BALL, a citizen of the United States, residing at Canton, in the county of Stark and State of Ohio, have invented certain new and useful Improvements in Bread-Knives; and I do hereby declare that the following is a full, clear, and exact description of the same, reference being had to the annexed drawings, making a part of this specification, and to the letters of reference marked thereon, in which—

Figure 1 is a side view of the knife, showing the handle properly attached. Fig. 2 is a detached view of the handle. Fig. 3 is a detached view of the blade. Fig. 4 is a longitudinal section of the blade.

The present invention has relation to bread-knives; and it consists in the novel construction hereinafter described and claimed.

Similar letters of reference indicate corresponding parts in all of the figures of the drawings.

In the accompanying drawings, A represents the blade, which may be of any desired size, reference being had to the size of the knife designed to be constructed. The blade is corrugated, which corrugations form oppositely-curved convexo-concave sections or parts, thereby forming oppositely-formed ridges and grooves upon opposite sides of the blade, said grooves and ridges extending in an inclined direction across the faces of the blade.

The object and purpose of corrugating the blade is to provide for stiffening the blade proper and at the same time form oppositely-curved teeth *a* upon the cutting-edge of the blade. Another object and purpose of extending the grooves and ridges diagonally across the face of the blade is to cause the blade to more easily enter the bread, or, in other words, cause the knife to run inward as it is pushed across the loaf.

It will be understood that by inclining the grooves and ridges the teeth *a* will stand or set at an angle to a right-angled line drawn through the blade, thereby providing a better cutting-edge.

The handle B may be of the form shown, and, as shown, it is provided with the arms *b*, which arms are provided with the tangs *c*, which tangs are so located that they will come upon opposite sides of the blade A. The tangs *c* are bent down upon the faces of the blade A, so as to securely bind and hold the blade in proper position.

For the purpose of attaching the handle B to the blade A in a permanent manner the handle and blade may be properly tined after the blade has been properly adjusted.

It will be understood that by forming the teeth *a* at the termination of the corrugations said teeth will retain their original position, shape, and form as the blade is worn away by use or grinding.

For the purpose of causing the handle B to better hold the blade A said blade is corrugated throughout its entire length, thereby providing a corrugated portion for attaching the handle and at the same time stiffening the handle end of the blade.

Having fully described my invention, what I claim as new, and desire to secure by Letters Patent, is—

The combination of the blade A, provided with diagonal corrugations, said diagonal corrugations extended beyond the edge of the blade forming the teeth *a*, said blade corrugated throughout its entire length, the handle B, provided with the arms *b*, having the tangs *c*, said arms embracing a portion of the corrugated blade, all arranged substantially as shown and described.

In testimony that I claim the above I have hereunto subscribed my name in the presence of two witnesses.

LORENZO D. BALL.

Witnesses:
F. W. BOND,
E. A. C. SMITH.